United States Patent
Boran et al.

(10) Patent No.: US 10,589,713 B2
(45) Date of Patent: Mar. 17, 2020

(54) DETERMINING AN OCCUPANCY STATUS OF A VEHICLE SEAT

(71) Applicant: Ford Global Technologies, LLC, Dearborn, MI (US)

(72) Inventors: Colm Boran, Novi, MI (US); Mark Crawford, Belleville, MI (US); Douglas Scott Rhode, Ypsilanti, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 117 days.

(21) Appl. No.: 15/380,639

(22) Filed: Dec. 15, 2016

(65) Prior Publication Data

US 2018/0170307 A1 Jun. 21, 2018

(51) Int. Cl.
| | |
|---|---|
| *B60R 22/48* | (2006.01) |
| *B60R 21/015* | (2006.01) |
| *B60W 50/14* | (2020.01) |
| *B60W 40/08* | (2012.01) |
| *B60W 50/00* | (2006.01) |

(52) U.S. Cl.
CPC .......... *B60R 22/48* (2013.01); *B60R 21/0155* (2014.10); *B60R 21/01544* (2014.10); *B60W 40/08* (2013.01); *B60W 50/14* (2013.01); *B60R 2022/4808* (2013.01); *B60R 2022/4816* (2013.01); *B60R 2022/4825* (2013.01); *B60R 2022/4841* (2013.01); *B60R 2022/4858* (2013.01); *B60W 2040/0881* (2013.01); *B60W 2050/0095* (2013.01); *B60W 2550/402* (2013.01)

(58) Field of Classification Search
None
See application file for complete search history.

(56) References Cited

U.S. PATENT DOCUMENTS

| | | | |
|---|---|---|---|
| 5,005,777 A | 4/1991 | Fernandez | |
| 5,558,370 A * | 9/1996 | Behr | B60R 21/0132 280/806 |
| 6,254,127 B1 | 7/2001 | Breed et al. | |
| 6,757,602 B2 | 6/2004 | Breed et al. | |
| 7,768,380 B2 | 8/2010 | Breed et al. | |
| 8,874,301 B1 | 10/2014 | Rao et al. | |
| 9,688,288 B1 * | 6/2017 | Lathrop | B60W 50/14 |

(Continued)

FOREIGN PATENT DOCUMENTS

| | | |
|---|---|---|
| DE | 102011112884 A1 | 3/2012 |
| DE | 102016002610 A1 | 10/2016 |
| WO | 2004065182 A1 | 8/2004 |

OTHER PUBLICATIONS

GB Search Report dated Jun. 12, 2018 re GB Appl. No. 1720598.0.

*Primary Examiner* — Kevin P Mahne
(74) *Attorney, Agent, or Firm* — Frank A. MacKenzie; Bejin Bieneman PLC

(57) ABSTRACT

A computer that may be programmed to: in response to receiving an indication that a vehicle is approaching a geofence boundary, retract slack in a webbing associated with a seat in the vehicle by actuating a seatbelt retractor; then receive measurement data from one or more sensors associated with the seat; using the data, determine whether an occupant occupies the seat; and when no occupant occupies the seat, then transmit an instruction to stop the vehicle.

10 Claims, 4 Drawing Sheets

(56) References Cited

U.S. PATENT DOCUMENTS

| | | |
|---|---|---|
| 2003/0234524 A1* | 12/2003 | Roychoudhury .......................... B60R 21/01512 280/735 |
| 2004/0017073 A1 | 1/2004 | Pavlov et al. |
| 2007/0029128 A1 | 2/2007 | Takao et al. |
| 2010/0095787 A1 | 4/2010 | Murphy et al. |
| 2010/0114436 A1* | 5/2010 | Bernhagen .............. B60R 22/48 701/45 |
| 2010/0222976 A1 | 9/2010 | Haug |
| 2016/0107655 A1 | 4/2016 | Desnoyer et al. |
| 2017/0361796 A1* | 12/2017 | Kim .................. B60R 21/01544 |
| 2017/0364070 A1* | 12/2017 | Oba ..................... G05D 1/0061 |

* cited by examiner

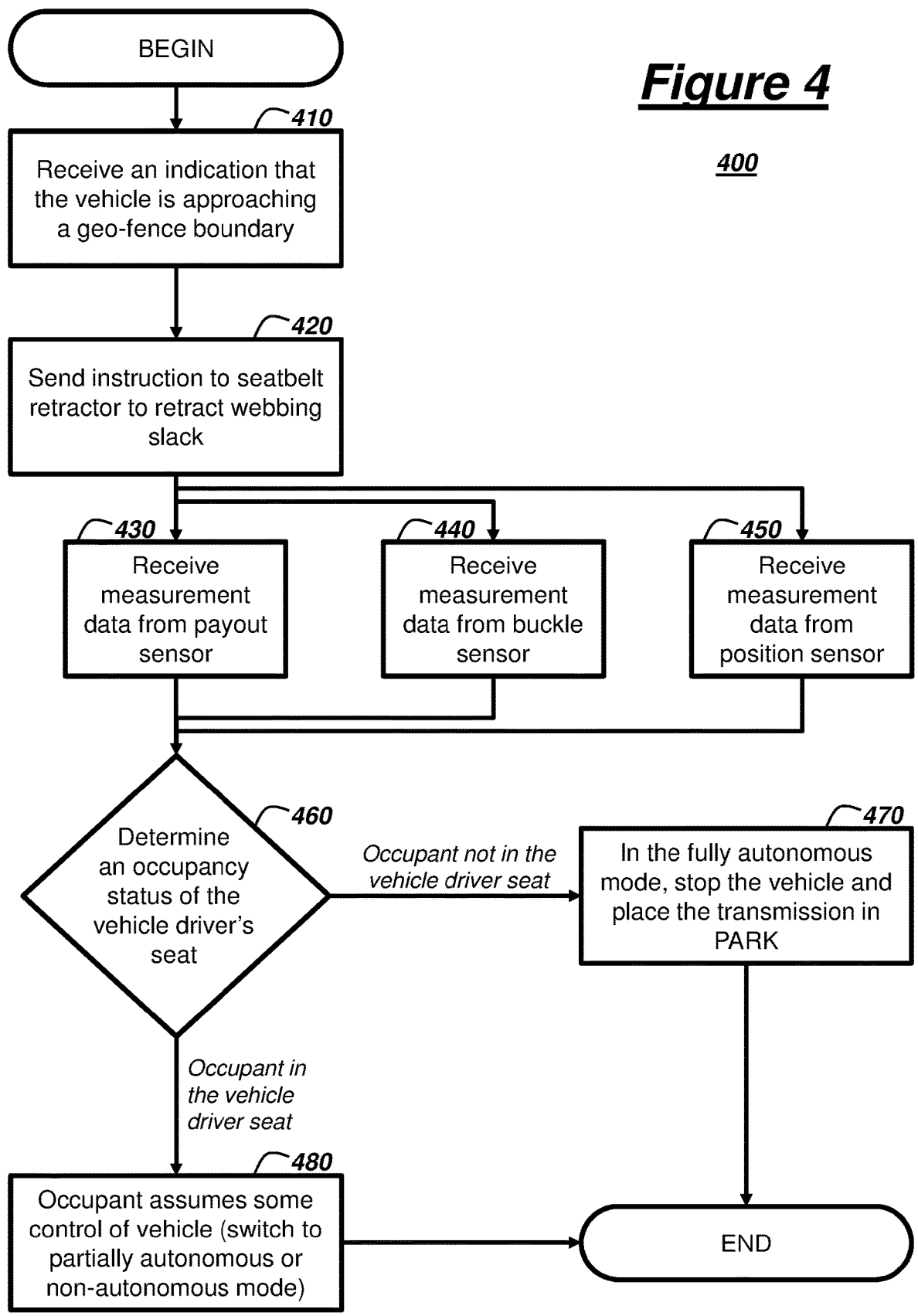

DETERMINING AN OCCUPANCY STATUS OF A VEHICLE SEAT

BACKGROUND

Modern vehicles may attempt to sense whether an occupant is located in a vehicle seat. However, present sensing systems can be inaccurate. For example, camera systems may have difficulty detecting the presence of an occupant—e.g., particularly when the occupant is wearing apparel around the head or face (e.g., hats, hoodies, etc.). Position sensors in or around the vehicle seat may attempt to determine whether the seat is occupied based on seat belt usage information; however, these systems can be inaccurate because they do not account for slack in the seatbelt.

BRIEF DESCRIPTION OF THE DRAWINGS

FIG. 4 is a flow diagram illustrating an example process for determining an occupancy status of a vehicle seat.

DETAILED DESCRIPTION

Figure 1:
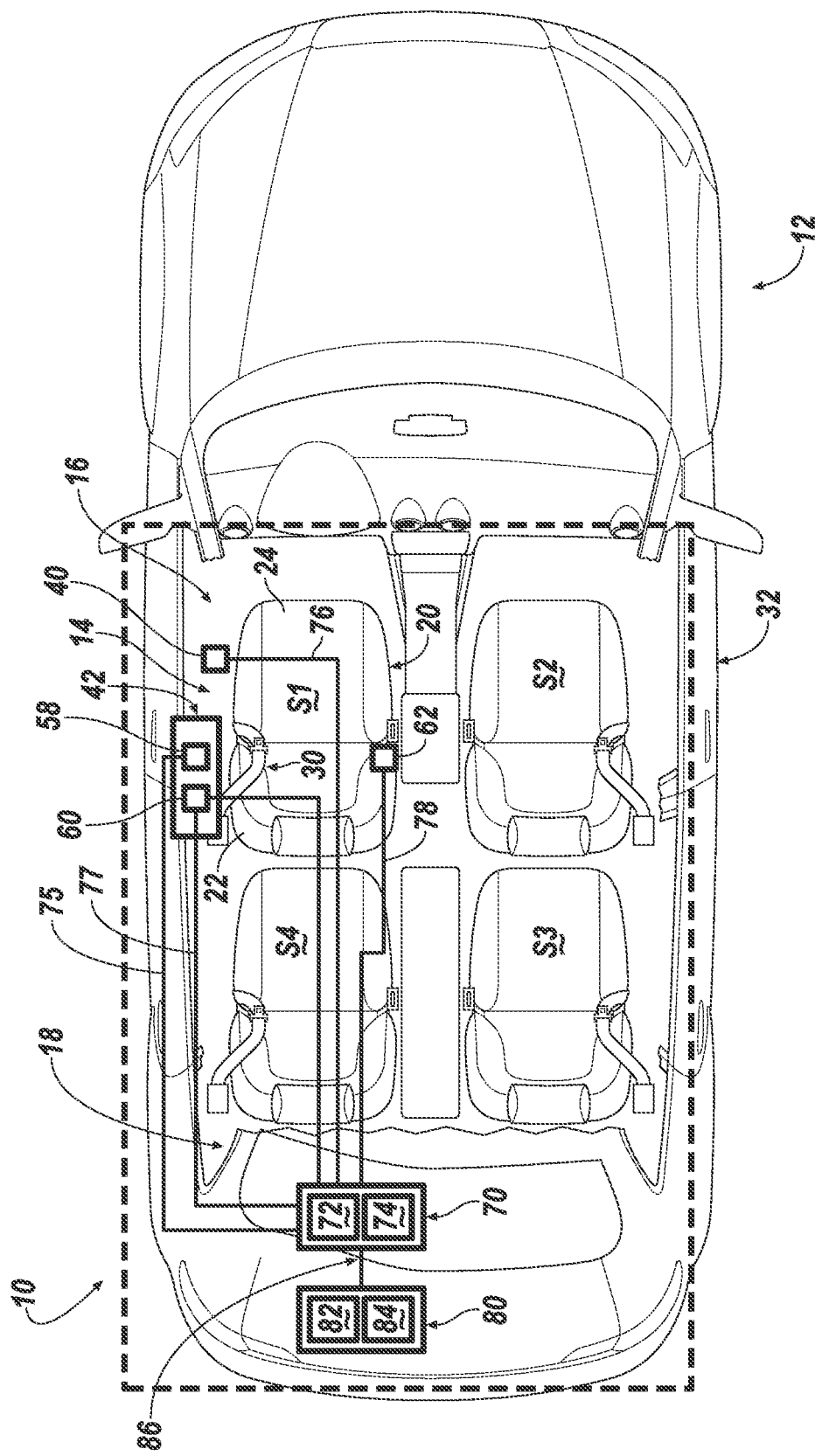
FIG. 1 is a top view of a vehicle that includes an example vehicle seat occupancy detection system.

A vehicle seat occupancy detection system 10 is described herein that can be used to determine whether a vehicle user or occupant (not shown) is in a driver seat assembly S1 of a vehicle 12 (FIG. 1). Vehicle 12, described more below, may be operated in a plurality of modes—e.g., including a fully autonomous mode and a non-autonomous mode. The occupancy detection system 10 may be particularly helpful when handing off vehicle control—e.g., when switching from the fully autonomous mode to the non-autonomous mode. For example, human factor engineering and other like data suggests that an occupant in the driver's seat assembly S1 may exit the assembly S1 while the vehicle 12 is being operated in a fully autonomous mode—e.g., to move to front or rear passenger seat assemblies S2-S4 within a passenger cabin 14 of the vehicle 12. Thus, in at least some circumstances, the occupant may not be situated in the driver's seat assembly S1 when vehicle 12 attempts to switch from a fully autonomous mode to a non-autonomous mode. As will be discussed more below, the occupancy detection system 10 can be configured so that it determines that the occupant is positioned in the driver's seat assembly S1 before switching to the non-autonomous mode. Alternatively, the occupancy detection system 10 can stop the vehicle 12 safely if it determines that the occupant is not positioned in the driver's seat assembly S1 at the time of the hand-off.

With regard to autonomous/non-autonomous modes, the Society of Automotive Engineers (SAE) has defined multiple levels of autonomous vehicle operation. At levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention. Vehicle 12 may operate in one or more of the levels of autonomous vehicle operation. As used herein, non-autonomous-driving modes of operation may refer to levels 0-1, partially autonomous modes of operation may refer to levels 2-3, and fully autonomous modes of operation may refer to levels 4-5. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled without some human operator intervention. Thus, as used herein, handing-off autonomous vehicle control (or simply handing-off vehicle control) can refer to exiting a fully autonomous mode of operation (e.g., changing from a fully autonomous mode to a partially autonomous mode or to a non-autonomous mode).

With regard to the passenger cabin 14, the cabin may be configured to house vehicle users or occupants (not shown). The cabin 14 includes one or more front seat assemblies (e.g., S1-S2) disposed at a front 16 of the cabin and one or more back seat assemblies (e.g., S3-S4) disposed behind the front seat assemblies S1-S2. The cabin 14 further may include third-row seat assemblies (not shown) at a rear 18 of the passenger cabin 14. Each seat assembly may have similar or identical features and/or functions; therefore, only one seat assembly (S1) will be described in detail.

Figure 2:
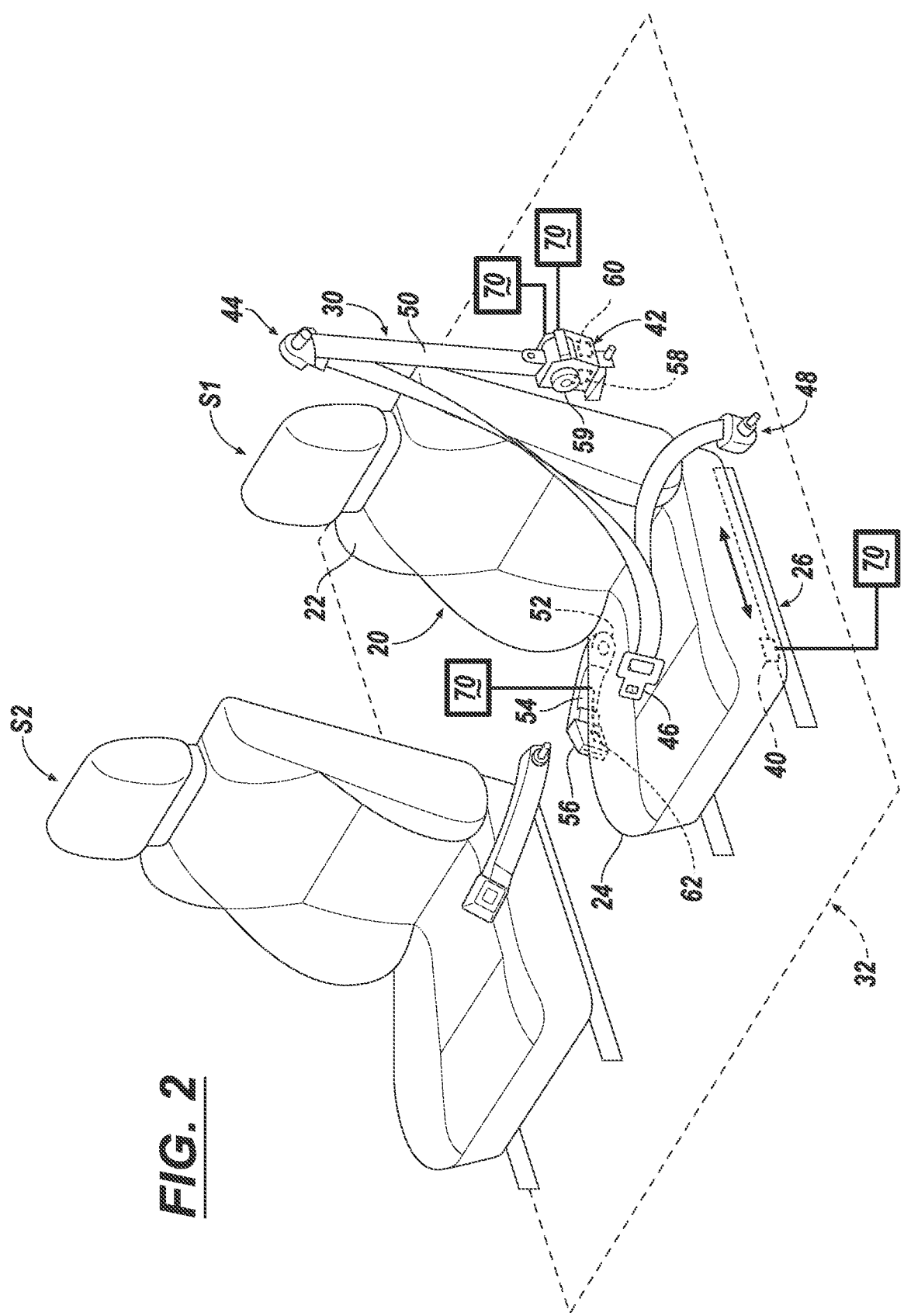
FIG. 2 is a perspective view of a portion of an example cabin of the vehicle shown in FIG. 1.

Referring now to FIG. 2, seat assembly S1 includes a vehicle seat 20 having a seat back 22 and a seat bottom 24, a mount 26, and a restraint or seatbelt assembly 30. The seat back 22 and/or seat bottom 24 may be adjustable by the occupant (e.g., adjustable with respect to position and/or orientation within cabin 14). In the illustrated example, the seat back 22 and bottom 24 are configured as a bucket seat; however, this is merely an example and other configurations are also possible.

The mount 26 may couple the seat to a vehicle body 32 and may enable movement of the seat 20 with respect thereto (e.g., having one or more degrees of freedom). Non-limiting examples of the mount 26 include the illustrated seat rails which permit fore-aft movement, a pivoting and/or other sliding floor bracket arrangements, a lift mechanism enabling movement of the vehicle seat 20 upwardly or downwardly relative to the vehicle body 32, or any combination thereof. The seat 20, the mount 26, or a combination thereof also may include a seat position sensor 40 adapted to sense movement and/or position of the vehicle seat 20 relative to the mount 26 and/or relative to the vehicle body 32. In the illustrated example, the sensor 40 is located on the mount 26 (e.g., beneath the seat bottom 24); however, this is merely one example. One non-limiting example of position sensor 40 is a magnetic proximity circuit; however, other examples also exist, including but not limited to electrical, optical, other magnetic, etc. circuits and components.

The vehicle body 32 described above supports the vehicle 12. The body 32 may be of a unibody construction in which at least some of the body 32 is exposed and may present a class-A surface (not numbered), i.e., a surface specifically manufactured to have a high-quality, finished aesthetic appearance free of blemishes. The body 32 may, alternatively, be of a body-on-frame construction, or of any other suitable construction. And the body 32 may be formed of any suitable material, for example, steel, aluminum, etc.

Seatbelt assembly 30 may be coupled to the body 32 or other suitable features of vehicle 12. For example, assembly 30 can include a seatbelt retractor 42, a guide 44, a slidable clip or latch plate (e.g., a male connecting portion) 46, and a first lower anchor 48 coupled to the body 32, a first webbing or belt 50, a second lower anchor 52 coupled to the body 32, a second webbing or belt 54, and a latch or buckle (e.g., female connecting portion) 56. The first webbing 50 extends from the retractor 42, through the guide 44, through the clip 46, and terminates at the first lower anchor 48, and the second webbing 54 extends between the second lower anchor 52 and the buckle 56. The clip 46 and buckle 56 can be couplable and/or decouplable by the occupant.

The retractor 42 may comprise a motor 58 for powered retraction of the first webbing 50 (e.g., into the retractor and onto a spool 59). For example, motor 58 may be responsive to an electrical input or instruction (e.g., from an onboard computer, as described below) such that, in response to the input, the motor 58 rotates the spool 59 and thereby retracts an excess or slack in the first webbing 50. Slack includes loose webbing or webbing not in tension, as illustrated in FIG. 2 between the anchored guide 44 and the clip 46, which rests on a top surface of seat bottom 24. In this context, the "slack" is defined as a portion of the webbing (e.g., first webbing 50) having a tension value that is less than a predetermined threshold. Thus in one example, the motor 58 retracts the first webbing until the predetermined threshold tension is sensed by the motor 58 and/or reached; one example of the predetermined threshold tension is at least 1 N. As will be explained in greater detail below, by retracting this slack from the first webbing 50, the occupancy detection system 10 may more accurately determine whether seat 20 is occupied before exiting a fully autonomous mode—as the measurement data received from sensors 40, 60, 62 may be more accurate.

The retractor 42 further may comprise a seatbelt payout sensor 60. Sensor 60 may be any suitable electronic sensing device configured to provide variable electrical output based on the length of first webbing 50 that has been extended from retractor 42. One non-limiting example of the payout sensor 60 is a Hall effect sensor located at the spool 59. Other examples are also possible.

Occupant detection system 10 may have other sensors as well. For example, buckle 56 may include a seatbelt latch or buckle sensor 62. Sensor 62 may be any suitable electronic sensing device configured to indicate whether the clip 46 is in a latched state (e.g., coupled to the buckle 56) or in an unlatched state (e.g., not coupled or not entirely coupled to the buckle 56). Non-limiting examples of sensor 62 include a Reed switch, a proximity switch, or other electrical or electro-magnetic switches or sensors. Other examples are also possible.

The vehicle seat occupancy detection system 10 includes position sensor 40, retractor 42 (including motor 58 and payout sensor 60), buckle sensor 62, an occupant detection module or computer 70 coupled to motor 58 and sensors 40, 60, 62, and an autonomous control module or computer 80 coupled to at least computer 70 via a communications network 86. As will be explained below, computer 70 is programmed to actuate motor 58 to retract first webbing 50, receive measurement data from sensors 40, 60, 62, and, based on the retraction and measurement data, determine whether seat 20 contains or is loaded with an occupant. And as will be explained below, computer 80 is programmed, among other things, to switch vehicle operation between the fully autonomous and one of a partially autonomous mode or a non-autonomous mode.

Computer 70 can include one or more processors 72 (only one is shown) and memory 74. Processor 72 can be any type of device capable of processing electronic instructions, non-limiting examples including a microprocessor, a microcontroller or controller, an application specific integrated circuit (ASIC), etc.—just to name a few. Processor 72 may be dedicated to computer 70, or it may be shared with other vehicle systems and/or subsystems. As will be described more below, computer 70 may be programmed to execute digitally-stored instructions stored in memory 74—including but not limited to: retracting slack in the first webbing 50 (e.g., associated with vehicle seat 20) by actuating retractor 42 in response to receiving a trigger; then receiving measurement data from sensors 40, 60, 62 (e.g., associated with seat 20); using the data, determining whether an occupant occupies the seat 20; and when no user occupies the seat 20, then transmitting an instruction to stop the vehicle (e.g., sending a command or message to computer 80).

Memory 74 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 74 may store one or more computer program products which may be embodied as software, firmware, or the like.

Computer 70 is coupled to motor 58 and sensors 40, 60, 62 via communication links or connections 75, 76, 77, 78 respectively. For example, the connections 75-78 may be discrete wired (e.g., electrical, optical, etc.) or wireless (e.g., Bluetooth, Wi-Fi, etc.) connections. Alternatively, or in combination with discrete connections, the motor 58 and sensors 40, 60, 62 may be connected to computer 70 via a data network such as network 86, described below.

Computers 70, 80 may be coupled together and may transmit signals to one another via communications network 86; while two computers 70, 80 are shown, the network 86 may connect any suitable number of additional computers (not shown) to one another as well. Non-limiting examples of communications network 86 include a controller area network (CAN) bus, Ethernet, Local Interconnect Network (LIN), and/or any other suitable wired or wireless communications network.

Computer 80 may control one or more aspects of autonomous vehicle operation, including, but not limited to switching vehicle operation from a fully autonomous mode to one of a partially autonomous mode or a non-autonomous mode. Computer 80 can include one or more processors 82 and memory 84. Processor 82 may have similar or identical features and/or functions as processor 72. For example, processor 82 can be any type of device capable of processing electronic instructions, non-limiting examples including a microprocessor, a microcontroller or controller, an application specific integrated circuit (ASIC), etc.—just to name a few. Processor 82 similarly may be dedicated to computer 80, or it may be shared with other vehicle systems and/or subsystems. As will be described more below, computer 80 may be programmed to execute digitally-stored instructions stored in memory 84—including but not limited to: operating vehicle 12 within a geo-fence region, such as the regions 87, 88 shown in FIG. 3 (which will be discussed more below); determining that the vehicle 12 is approaching a geo-fence boundary (e.g., 90) of a geo-fence region (e.g., 88), and providing to computer 70 a trigger (e.g., an indication such as an instruction, message, command, etc.) that the vehicle 12 is approaching the boundary; receiving an indication (e.g., an instruction or the like) from computer 70 indicating an occupancy status of driver's seat S1; when the indication is that the occupant occupies the driver's seat S1, exiting a fully autonomous mode to a partially or non-autonomous mode; and when the indication is that the occupant is not located in the driver's seat S1, then safely slowing the movement of vehicle 12 to a stop. Computer 80 may carry out additional instructions including using localization data to operate the vehicle in a partially autonomous or fully autonomous mode and the like.

Memory 84 have similar or identical features and/or functions as memory 74. For example, memory 84 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 84 may store one or more computer program products which may be embodied as software, firmware, or the like. In one implementation, at least some of the executable instructions stored on memory 84 are similar or identical to those stored on memory 74; however, this is not required.

For example, while computer 70 and computer 80 are described as two separate devices, in at least one example, they can be a single device. For example, a single computer may be programmed to carry out the instructions described above. Similarly, the instructions may be stored on a single memory device—which may or may not be logically partitioned. Or in the alternative, multiple memory devices may be used which store at least some instructions different than the other. These are merely examples; and others exist.

Turning now to FIG. 4, a flow diagram is shown illustrating an exemplary process 400 for detecting whether an occupant is located in the driver's seat S1 prior to switching from a fully autonomous mode to a partially autonomous or non-autonomous mode. The process 400 begins at block 410 wherein the computer 70 is triggered to determine whether an occupant is located in one of the seats S1-S4. According to one example, process 400 proceeds once sensor 62 indicates to computer 70 a latched state—e.g., in at least some implementations, vehicle 12 may be at least partially inoperable (in at least the fully autonomous mode) when the occupant has not fastened his/her seat clip 46 and buckle 56.

In one example of block 410, the computer 70 is triggered by computer 80 to determine whether an occupant is located in the driver's seat 20. In another example, computer 70 also controls at least some autonomous vehicle operations and/or switching between autonomous modes, and computer 70 itself determines the trigger based on the execution of other instructions or logical functions.

Figure 3:
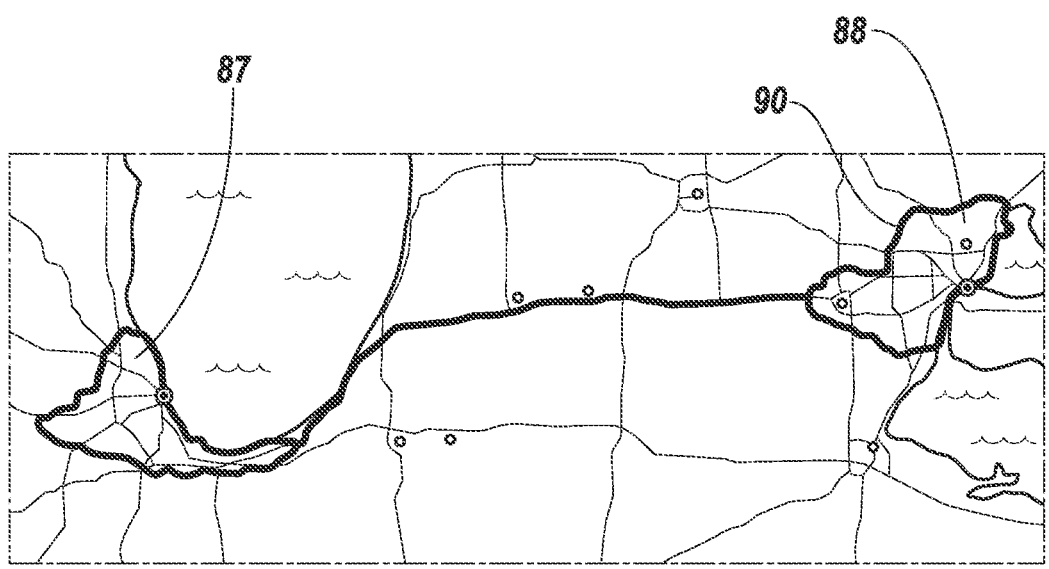
FIG. 3 is a map illustrating two example geo-fence regions.

Regardless, in at least one example, the trigger is received at computer 70 in response to computer 80 determining that the vehicle 12 is approaching a geo-fence boundary (e.g., boundary 90, FIG. 3) of a geo-fence region (e.g., region 88, FIG. 3). As used herein, a geo-fence region is a geographical zone, area, roadway, etc. that has been computer-imaged or mapped (into localization data) so that the vehicle 12 may operate in a fully autonomous mode (e.g., Level 4 or 5) using the localization data. Localization data includes computerized or imaged roadway data and/or other driving data that is used by vehicle 12 to operate in the fully autonomous mode. As used herein, the geo-fence boundary is an extremity or outer peripheral line or limit of the geo-fence region. Thus, when the vehicle 12 crosses the geo-fence boundary (i.e., outside of the geo-fence region), insufficient localization data may be available for Level 4 or Level 5 operation—e.g., in the area(s) outside the geo-fence region, the vehicle may have inadequate information for autonomous operation. This is of course merely one example of a trigger; other triggers may be used which are or are not associated with autonomous driving.

Following execution of block 410, computer 70 may execute process block 420 which includes sending an instruction from computer 70 to the seatbelt retractor 42 instructing it to retract slack in the first webbing 50 (webbing associated with vehicle seat S1). In response to the instruction, the retractor 42 may retract any suitable amount of slack in first webbing 50. According to one example, the retractor 42 may retract first webbing 50 until a predetermined threshold tension is reached (e.g., until the tension is at least 1 N. The instruction may be in any suitable form; e.g., including but not limited to packet data over a bus, one or more discrete electrical signals (e.g., digital '1s' or '0s'), etc.

In blocks 430, 440, 450 which follow, computer 70 may receive measurement data from sensors 60, 62, and 40, respectively. For example, measurement data from the pay-out sensor 60 may indicate a spool 59 position, e.g., which can be used to determine a length of first webbing 50 extended from the retractor 42. Measurement data from the buckle sensor 62 may indicate either a latched state or an unlatched state of the clip 46 and buckle 56. Further, measurement data received from sensor 40 may indicate a seat 20 position relative to the mount 26 and/or vehicle body 32.

Execution of blocks 430-450 may occur in response to the completed execution of process block 420. In this manner, the measurement data may more accurately reflect whether an occupant is contained within seatbelt assembly 30 of seat 20. For example, if the occupant has left the seat 20 but the first webbing 50 did not fully retract the slack, e.g., the webbing 50 dangles as illustrated in FIG. 2, then the computer 70 could make a false-positive determination—e.g., inaccurate input data yielding an inaccurate determination. Thus, in this example, the false-positive determination may be that the occupant remains seated in seat 20 when in fact, he/she does not. In such a condition, exiting a fully autonomous mode and switching to a partially autonomous or non-autonomous mode will likely be hazardous. Thus, receiving accurate measurement data at computer 70 promotes vehicle and occupant safety.

In at least one example, it is contemplated that process blocks 430, 440, 450 occur within a predetermined period of time of the seatbelt retractor actuation (block 420) (e.g. within 60-120 seconds). In this manner, the measurement data is more likely indicative of the current occupancy status of seat 20 (e.g., occupied or vacant). In addition, computer 70 may receive the measurement data in blocks 430-450 concurrently, consecutively, and/or in any suitable order.

Once computer 70 receives the measurement data (blocks 430-450), computer 70 may proceed to block 460 wherein it determines—using the measurement data obtained in blocks 430-450—whether an occupant is located in the vehicle driver's seat 20. At least one example of this determination includes a determination of the amount or length of extended first webbing 50 (e.g., a length $L_{EXTENDED}$) (using measurement data from payout sensor 60). As described below, this extended first webbing 50 is relative to the position of seat 20 according to measurement data from position sensor 40, and also relative to whether the clip 46 and buckle 56 are in the latched or unlatched state according to measurement data from buckle sensor 62.

More particularly, computer 70 may calculate a length of "used" first webbing 50 $L_{USED}$ (e.g., used by the occupant,) by subtracting a length $L_{EMPTY, POSITION}$ associated with the seat 20 being empty from the length $L_{EXTENDED}$ (see Equation 1). When the length $L_{USED}$ is greater than or equal to a predetermined threshold, e.g., stored in memory 74, the computer 70 determines that the seat 20 is occupied. Otherwise, computer 70 determines that the seat 20 is not occupied. As described below, a number of values of the length $L_{EMPTY, POSITION}$ may be determined in advance of process 400, as the length of extended webbing will vary depending on seat 20 location. These values may be determined, e.g., at a vehicle manufacturer, prior to sale of vehicle 12; they may account for a particular vehicle make, vehicle model, vehicle seat or interior features, etc.

$$L_{USED} = L_{EXTENDED} - L_{EMPTY, POSITION} \quad \text{(Equation 1)}$$

In at least one example, the values of length $L_{EMPTY, POSITION}$ are stored in memory 74 as a lookup table. For example, the lookup table may include a plurality of extended webbing lengths which each correspond to a particular position of seat 20, e.g., so that the length of $L_{EMPTY, POSITION}$ is a function of seat 20 position. Thus, using the illustrative mount 26 shown in FIG. 2 e.g., rails, a predetermined quantity of fore-aft seat positions may exist along the rails. For each incremental seat 20 position along the rails, a value of length $L_{EMPTY, POSITION}$ may be determined and stored in memory 74, e.g., after the retractor 42 first retracts any slack in first webbing 50 to a predetermined threshold tension.

Thus, when the value $L_{EMPTY, POSITION}$ is subtracted from the length of the extended first webbing 50 ($L_{EXTENDED}$), the length remaining (e.g., $L_{USED}$) is attributable to the occupant (if present). Thus, if $L_{EXTENDED} = L_{EMPTY, POSITION}$ (and $L_{USED} = 0$), then computer 70 determines the occupant status to be vacant, and the process proceeds to block 470. Similarly, the process 400 proceeds to block 470 when the length $L_{USED}$ is less than a predetermined threshold, e.g., 11 cm centimeters. However, if length $L_{USED}$ is greater than or equal to the predetermined threshold, then computer 70 determines the occupant status to be occupied, and the process proceeds to block 480.

In block 470, computer 70 may provide an instruction that causes vehicle 12—still operating in the fully autonomous mode—to stop or cease moving. This instruction may be received by computer 80—which in at least one example—controls some aspects of autonomous operation. The instruction also may instruct that the vehicle 12 be placed in PARK—e.g., disabling autonomous operation without a driver occupant in seat 20. Note that this also may inhibit an attempt to operate vehicle 12 in a fully autonomous mode outside of geo-fence region 88.

In other examples of block 470, the instruction may include providing one or more alerts to the vehicle occupants prior to and/or after stopping vehicle movement. In this manner, if an occupant has moved within the vehicle 12, the occupant may have an opportunity to move back into seat 20 prior to crossing the geo-fence boundary 90. Following execution of block 470, process 400 ends.

In block 480, the vehicle may hand-off vehicle control to the occupant (e.g., exit a fully autonomous mode and switch to a partially autonomous or non-autonomous mode). In this block, computer 70 may present occupant in seat 20 with one or more notifications thereby alerting the occupant of a hand-off initiation procedure. In at least some examples, computer 70 and/or computer 80 additionally may determine other characteristics of the occupant, e.g., an alertness level of the occupant driver, an age of the occupant driver, a sobriety of the occupant driver, etc. Following execution of block 480, process 400 may end.

Process 400 was described with respect to seat 20 shown translating in a longitudinal direction with respect to an axial length of vehicle 12. It should be appreciated that in other examples the seat 20 could move differently, e.g., seat 20 could translate in other directions (left-right, up-down), the seat 20 could rotate, etc.; thus, the length $L_{EMPTY, POSITION}$ may correspond to any suitable number of incremental positions.

Further, process 400 was described with respect to a driver's seat 20; however, the same process could be carried out with respect to seats of the other seat assemblies S2-S4. Moreover, the driver's seat 20 was shown on the left side of vehicle 12; however, the driver's seat instead could be located on the right side. Other examples are also possible.

In some examples, the occupancy detection system 10 could utilize data from additional sensors (e.g., including but not limited to imaging sensors (e.g., cameras or the like), sensors which measure force or pressure, etc.). However, in at least one example, computer 70 does not use imaging or pressure sensors to determine—or contribute to the determination of—the occupancy status of seat 20. Imaging sensors can be costly and sometimes experience difficulty visually distinguishing whether an occupant is present. For example, when the occupant is wearing a hat, hoodie, etc., a camera may err reporting a vacancy when in fact the seat is occupied. Seat pressure sensors may be unable to distinguish a human from stowage or cargo in the vehicle. Thus, in at least one example, the computer 70 determines the occupancy status using only measurement data from sensors 40, 60, 62.

In another example, computer 70 may store the measurement data gathered above and use this information to determine future occupancy statuses. In one implementation, a change in driver occupants may be detected. For example, if a first driver occupant repeatedly used seat 20, then the length $L_{USED\,(1)}$ may be a consistent value each time the first driver occupant used seat 20. If perchance the first driver occupant moves within the vehicle 12 during fully autonomous operation and a second driver occupant is now located in seat 20, then computer 70 may detect this difference based on a difference in length $L_{USED}$. For example, second driver occupant may have a length $L_{USED\,(2)}$ which is different from $L_{USED\,(1)}$. Further, the computer 70 (or computer 80) could carry out additional measures to be sure the new driver occupant was permitted to operate the vehicle 12 in the partially autonomous or non-autonomous modes before handing-off vehicle control. For example, we know that a driver needs some time to assess the traffic and road situation before they should take control of the vehicle. The computer 70 (or computer 80) could delay handing-off the vehicle (for example 5 seconds). Another example, the computer(s) could determine whether the second driver was authorized to operate vehicle 12 through use of fingerprint identification or password.

In the description above, the first webbing was retractable. In other examples, the second webbing 54 could be retracted instead. Or both first and second webbings 50, 54 could be retracted. Other examples also exist.

In the description above, the computer 70 was programmed to retract slack in the webbing in response to a trigger—e.g., receiving an indication that the vehicle is approaching a geo-fence boundary (e.g., 90). The computer 70 also can be programmed to determine whether the occupant occupies the seat 20 in response to receiving an indication that the vehicle is approaching the geo-fence boundary (e.g., 90). These triggers can be derived from many sources. For example, if the road conditions are marginal due to rain, fog or snow the computer 70 may be triggered to retract the slack and determine whether an occupant occupies the seat 20.

The subject matter set forth herein includes an occupant detection system for a vehicle that includes at least one computer programmed to determine a status of a vehicle seat based on a trigger. In one non-limiting example, the trigger is an indication that the vehicle is approaching a geo-fence boundary (or is about to exit a geo-fence region). In response to the trigger, the computer actuates a seatbelt retractor at the vehicle seat so that it retracts the seatbelt webbing. Thereafter, the computer receives measurement data from a number of sensors associated with the vehicle seat and uses that data to determine the occupancy status of the vehicle seat. In some examples, when the vehicle is operating in an autonomous mode and when the computer determines that the vehicle seat is vacant or unoccupied, then the computer provides an instruction which causes the vehicle to cease moving. And in one example, when the vehicle is operating in an autonomous mode and when the computer determines that the vehicle seat is occupied, then the computer provides an instruction which causes the vehicle to exit the autonomous mode.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, [what the processor is supposed to do]. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising: a processor and memory storing instructions, the instructions comprising, to:
   operate a vehicle in a geofence region in a fully autonomous mode, wherein the geofence region is within a geofence boundary that defines a periphery of the geofence region;
   determine that the vehicle is approaching the geofence boundary; and
   based on determining that the vehicle is approaching the geofence boundary, determine whether attempt to hand-off control to a driver of the vehicle or to stop the vehicle by:
      determining whether the driver occupies a driver's seat of the vehicle by:
         retracting slack in a webbing associated with the driver's seat by actuating a seatbelt retractor, and using data from a seatbelt payout sensor and a seat position sensor, determining a length ($L_{USED}$) of the webbing extended from the retractor; and
      when the driver is determined to occupy the driver's seat, then attempting to hand-off control of the vehicle to the driver; and
      when the driver is determined to not occupy the driver's seat, then transmit an instruction to stop the vehicle.

2. The computer of claim 1, wherein the instructions further comprise to: determine whether the driver occupies the driver's seat using data from a seatbelt buckle sensor.

3. The computer of claim 2, wherein the instructions further comprise to: determine whether the driver occupies the driver's seat by: determining that the buckle sensor indicates a latched state; using the payout sensor, determining a length $L_{EXTENDED}$ of the webbing extended from the retractor; and determining the length $L_{USED}$ by subtracting a length $L_{EMPTY,\ POSITION}$ from the length $L_{EXTENDED}$, wherein the length $L_{EMPTY,\ POSITION}$ corresponds to a position of the driver's seat relative to a body of the vehicle, wherein the instructions further comprise to determine that the driver's seat is unoccupied when the length $L_{USED}$ is less than a predetermined threshold.

4. The computer of claim 1, wherein the instructions further comprise to: determine whether the driver occupies the driver's seat in response to a trigger from another vehicle computer.

5. The computer of claim 1, wherein attempting to hand-off vehicle control to the driver is further based on a characteristic of the driver, wherein the characteristic includes at least one of an alertness level of the driver, an age of the driver, or a sobriety of the driver.

6. A method, comprising:
   operating a vehicle in a geofence region in a fully autonomous mode, wherein the geofence region is within a geofence boundary that defines a periphery of the geofence region;
   determining that the vehicle is approaching a geofence boundary; and
   based on determining that the vehicle is approaching the geofence boundary, determining to either to hand-off control of the vehicle to a driver of the vehicle or to stop the vehicle, wherein determining whether to hand-off control or to stop the vehicle comprises:
      determining whether the driver occupies a driver's seat of the vehicle by:
         retracting slack in a webbing associated with the driver's seat by actuating a seatbelt retractor; and then
         using data from a seatbelt payout sensor and a seat position sensor, determining a length ($L_{USED}$) of the webbing extended from the retractor.

7. The method of claim 6, wherein the determining further comprises using data from a seatbelt buckle sensor.

8. The method of claim 7, wherein determining whether the driver occupies the driver's seat further comprises: determining that the buckle sensor indicates a latched state; using the payout sensor, determining a length $L_{EXTENDED}$ of the webbing extended from the retractor; determining the length $L_{USED}$ by subtracting a length $L_{EMPTY,\ POSITION}$ from the length $L_{EXTENDED}$, wherein the length $L_{EMPTY,\ POSITION}$ corresponds to a position of the driver's seat relative to a body of the vehicle; and determining that no driver occupies the driver's seat when the length $L_{USED}$ is less than a predetermined threshold.

9. The method of claim 6, further comprising: determining that the driver occupies the driver's seat; and then attempting to hand-off control of the vehicle to the driver.

10. The method of claim 6, further comprising: determining that the driver does not occupy the driver's seat; and then transmitting an instruction to stop the vehicle.

* * * * *